E. RUSSELL.
PNEUMATIC TIRE PROTECTOR.
APPLICATION FILED JULY 22, 1909.
969,908.
Patented Sept. 13, 1910.
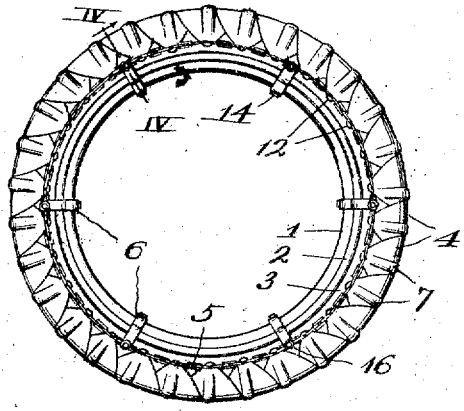
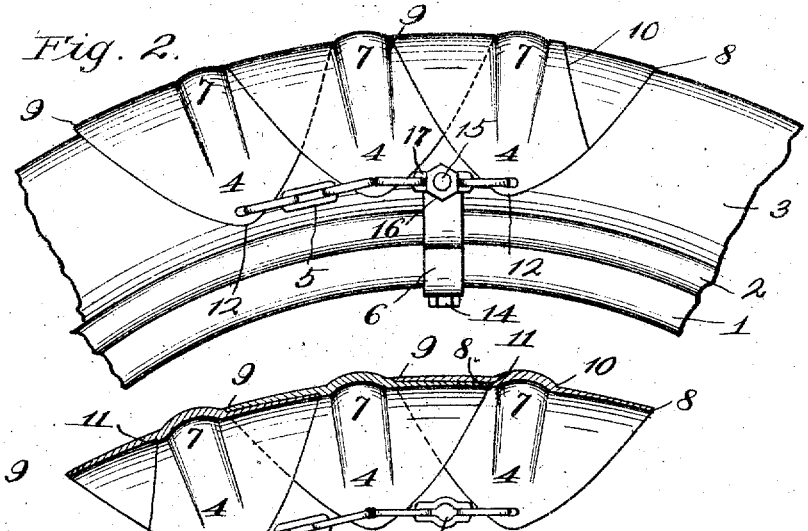
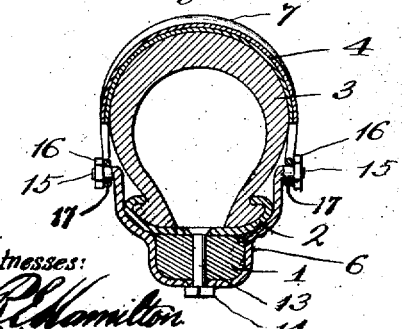
Witnesses:
R. L. Hamilton
M. Cox
Inventor
Edwin Russell,
By F. G. Fischer,
atty.

UNITED STATES PATENT OFFICE.

EDWIN RUSSELL, OF KANSAS CITY, KANSAS.

PNEUMATIC-TIRE PROTECTOR.

969,908.

Specification of Letters Patent. Patented Sept. 13, 1910.

Application filed July 22, 1909. Serial No. 508,951.

*To all whom it may concern:*

Be it known that I, EDWIN RUSSELL, a citizen of the United States, residing at Kansas City, in the county of Wyandotte and State of Kansas, have invented certain new and useful Improvements in Pneumatic-Tire Protectors, of which the following is a specification.

My invention relates to improvements in pneumatic-tire protectors, and my object is to produce a device of this character which will prolong the lives of pneumatic-tires and prevent the same from becoming punctured while in use on automobiles.

A further object is to provide a simple device of this character which can be readily applied to or removed from the tire, and which will prevent the wheels of an automobile from slipping on wet pavements.

A further object is to provide a device of this character which can be applied to the exterior of the tire to prevent the inner tube thereof from becoming punctured.

In order that the invention may be fully understood, reference will now be made to the accompanying drawings, in which:

Figure 1 represents a side elevation of an automobile wheel provided with my protector, the spokes of the wheel being omitted. Fig. 2 is an enlarged side elevation of a portion of the same. Fig. 3 is a vertical, longitudinal, sectional view of three sections of my device. Fig. 4 is a cross section on line IV—IV of Fig. 1.

1 designates the felly of the wheel; 2, the metallic rim secured to the felly; and 3, the outer tube of the tire secured to the metallic rim, all of which are of ordinary construction, and form no part of the present invention, which latter consists of a series of resilient overlapping diamond shaped shells or sections 4, cables 5 connecting said diamond shaped shells or sections, and a yoke 6 for holding the sections in position upon the outer portion of the tire.

The shells or sections are provided with transverse corrugations 7 to prevent the wheels of the automobile from slipping, and each section tapers toward its front and rear sides 8 and 9, respectively, and is provided with an exterior shoulder 10 and an interior shoulder 11, against which the rear end of the preceding section and the front end of the succeeding section, respectively, are adapted to abut. The depth of shoulders 10 and 11 equals the thickness of ends 8 and 9, so that said ends will be flush with the adjacent portions of the sections instead of projecting therefrom and thereby injuring the tire, as would probably be the case should the front end 8 of each section project below the adjacent portion of each succeeding section. The sections taper toward their terminals 12 and are flexibly connected by the cables 5 so that said sections may readily accommodate themselves to the movements of the tire, when the wheel is running over the surface of a road.

Yokes 6 are held in position on the wheel by a plurality of bolts 13, extending through the rims of the wheel, and retaining-nuts 14 engaging the threaded ends of said bolts. Yokes 6 have outturned terminals 15 which extend through enlarged links 17 of the cable and are provided with retaining-nuts 16 to reliably hold the links in position thereon and prevent the device from creeping on the tire.

When one of the sections 4 wears out, the protector may be readily taken off the tire to replace the worn out section by removing nuts 16 and disengaging links 17 from the outturned terminals 15 of the yokes.

Having thus described my invention, what I claim is:—

1. A protector for tires, comprising, in combination, a series of shells substantially diamond shaped and having their longitudinal end portions of reduced thickness and having upraised corrugations centrally dividing said reduced thickness, said shells overlapping one another to the extent of said reduced portions, the overlapping portions constituting the longitudinal apexes of the diamond shaped shells, flexible means connecting the transverse ends of said shells to cause them to assume an arcuate curvature, and yoke means supplied at intervals to yoke the protector to a wheel.

2. A protector for tires, comprising, in combination, a series of diamond shaped shells having their longitudinal end portions of reduced thickness, said shells overlapping one another to the extent of said reduced portions and the apex of each shell approaching the transverse diameters of the adjacent shells, link connections joining the transverse ends of said shells to conform them to a circle, and spaced yokes located at intervals around said circle and pivotally secured to said link connections.

3. A protector for tires, comprising, in combination, a series of shells substantially diamond shaped and having their longitudinal end portions of reduced thickness, said shells overlapping one another to the extent of said reduced portions, link connections joining the transverse ends of said shells to conform them to a circle, and spaced yokes located at intervals around said circle and pivotally secured to said link connections, said yokes comprising U-shaped straps adapted to engage around the inner periphery of a wheel felly and having its ends out-turned to form pivot-members to engage certain of said link connections.

In testimony whereof I affix my signature, in the presence of two witnesses.

EDWIN RUSSELL.

Witnesses:
 D. W. C. BOWERS,
 A. E. GAMMAGE.